Figure 1:
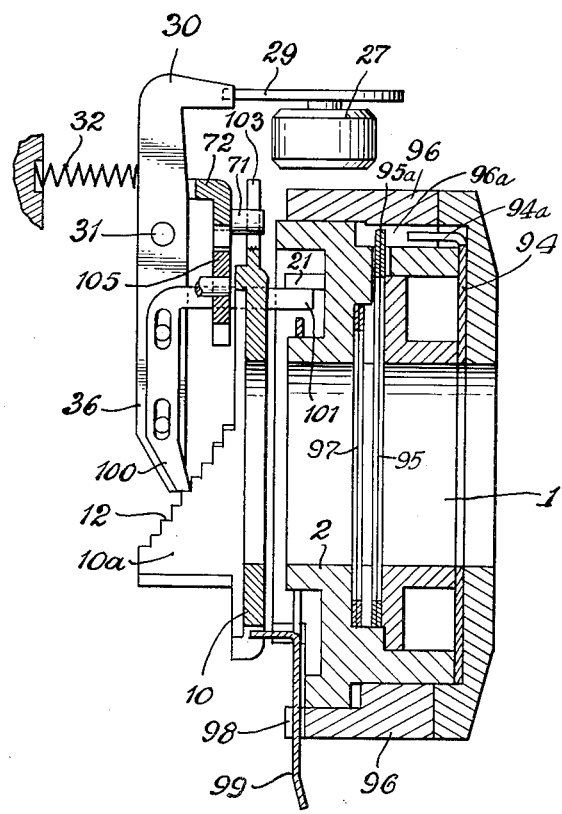

July 24, 1962   E. SAUER ET AL   3,045,568
PHOTOGRAPHIC CAMERA WITH AUTOMATIC EXPOSURE CONTROL
Filed Jan. 25, 1960   5 Sheets-Sheet 1

July 24, 1962  E. SAUER ET AL  3,045,568
PHOTOGRAPHIC CAMERA WITH AUTOMATIC EXPOSURE CONTROL
Filed Jan. 25, 1960  5 Sheets-Sheet 2

United States Patent Office 3,045,568
Patented July 24, 1962

3,045,568
PHOTOGRAPHIC CAMERA WITH AUTOMATIC EXPOSURE CONTROL
Edgar Sauer, Stuttgart, Horst Wutzler, Stuttgart-Degerloch, and Johann Hahn, Stuttgart, Germany, assignors to Zeiss Ikon Aktiengesellschaft, Stuttgart, Germany
Filed Jan. 25, 1960, Ser. No. 4,324
Claims priority, application Germany Jan. 28, 1959
2 Claims. (Cl. 95—10)

The present invention relates to photographic cameras in which the shutter speed and the diaphragm aperture values, which determine the exposure, are automatically produced and adjusted in accordance with the light values determined by an exposure meter.

The object of the present invention is to provide for a photographer a photographic camera which basically will fully automatically adjust the shutter speed and the diaphragm aperture.

A further object of the invention is to prevent any arbitrary adjustment and selection of the exposure values and thus provide a photographic camera the operation of which does not require any special skill nor mental activity.

For this purpose the present invention provides that the shutter speed adjusting device and the diaphragm aperture adjusting device of the camera are coupled with each other, preferably in a single shutter device over a common adjusting range in such a manner that by adjustment in one direction the shutter speed values and the diaphragm aperture values are decreased, while by adjustment in other direction both values are increased. Furthermore, when winding the camera, namely the film advance means and the shutter tensioning means, the shutter speed adjustment device and the diaphragm aperture adjustment device are brought into one end position of the adjustment range. In case the camera is released, said adjustment devices will move along the adjustment range in the direction toward the other end position until they encounter and engage a catch member, whereupon the shutter is automatically released.

It is another object of the present invention to design this basic arrangement in such a manner that, when the camera is wound, the shutter speed adjusting device and the diaphragm aperture adjusting device will be in the end position of the adjusting range representing their maximum values, and when the camera is released, said adjusting devices will move in the direction of reducing their values. In such a case the photographic camera can be designed as a single lens mirror reflex camera with automatic mirror control preferably provided with a shutter which is combined with the camera lens, which shutter is provided with a control device for opening the shutter for intermediate viewing of the object to be photographed.

It may be useful to design the arrangement for the automatic exposure control in such a manner that it may be disconnected from the shutter speed adjusting device and the diaphragm aperture adjusting device in order to employ the camera for particular conditions, for instance for making flashlight exposures.

The details of the invention will be described in the following description with reference to a few embodiments illustrated in the accompanying drawings in which the same parts are indicated by the same numerals throughout the drawings.

Figure 10:
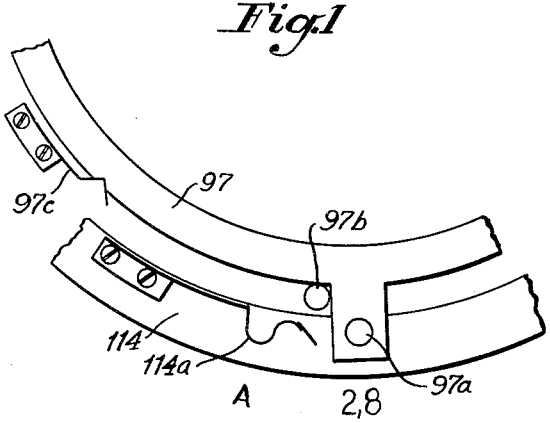
Figure 5:
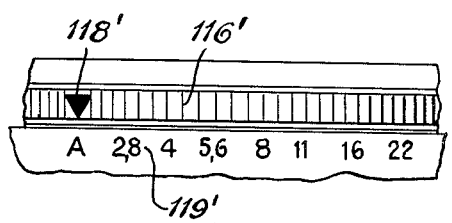
Figure 3:
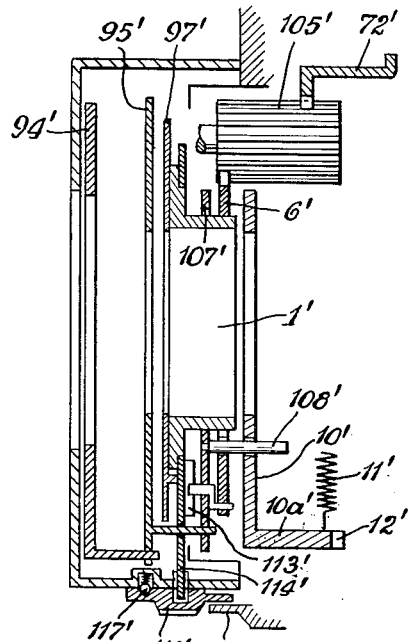
Figure 4:
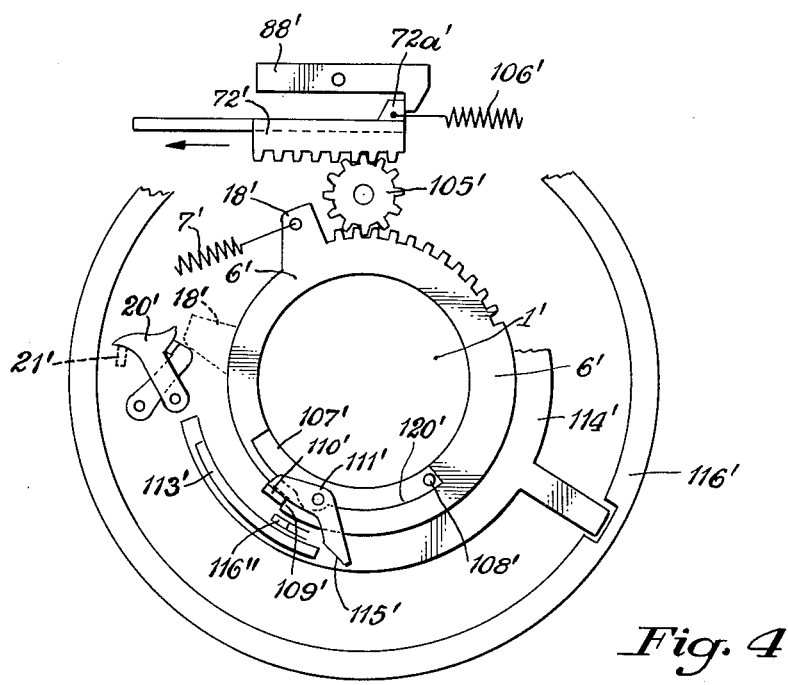
Figure 6:
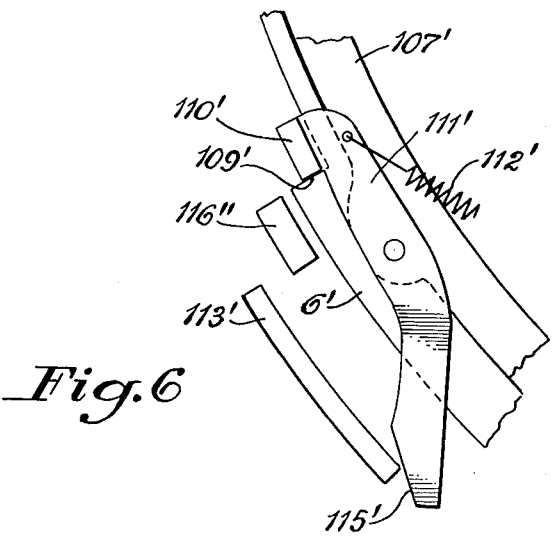
Figure 7:
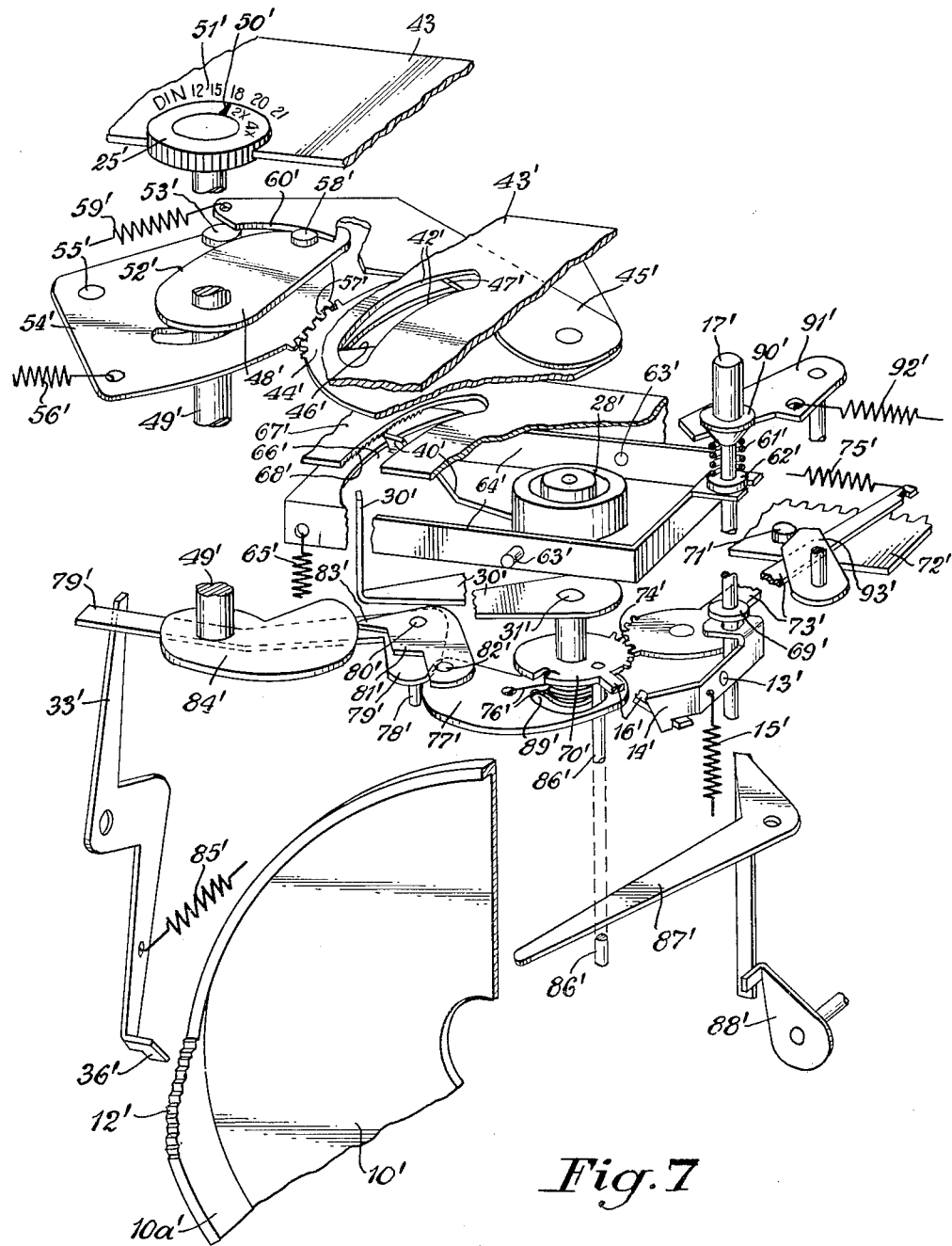
Figure 9:
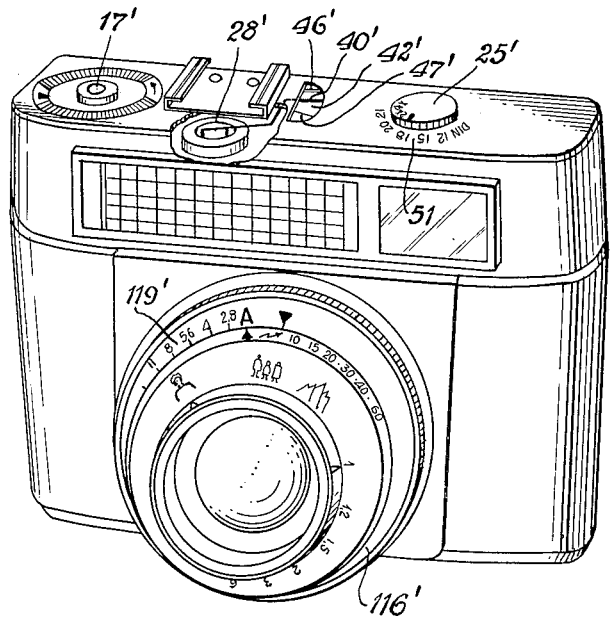
Figure 8:
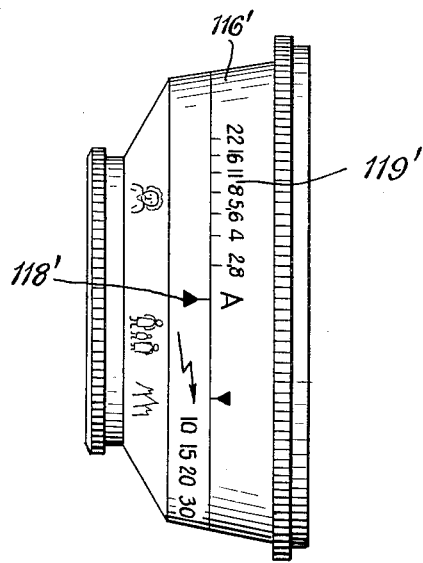

In the drawings:
FIG. 1 shows a schematic presentation of a vertical cross-sectional view of a shutter speed adjusting device and a diaphragm aperture adjusting device arranged in a lens shutter together with the drive and automatic control, FIG. 2 shows a rear view of the above arrangement,
FIG. 3 shows schematically a side elevation view of a second embodiment of an automatic shutter speed adjusting device and diaphragm aperture adjusting device of the invention,
FIG. 4 shows a front elevation view of the arrangement shown in FIG. 3,
FIG. 5 shows a portion of the arrangement shown in FIG. 3,
FIG. 6 shows a portion of the arrangement shown in FIG. 4 in an enlarged scale,
FIG. 7 shows a perspective view of an automatic exposure control device of which the basic shutter speed adjusting and diaphragm adjusting members are shown in the FIGS. 3 to 6 inclusive,
FIG. 8 shows a side elevation view of a camera objective provided with either one of the two exposure control devices of the invention,
FIG. 9 shows a view of a camera provided with either one of the two automatic exposure control devices of the invention, and
FIG. 10 illustrates a releasable connection which in the arrangement of FIG. 7 may be employed between a diaphragm adjusting ring and the diaphragm cage.

Figure 2:
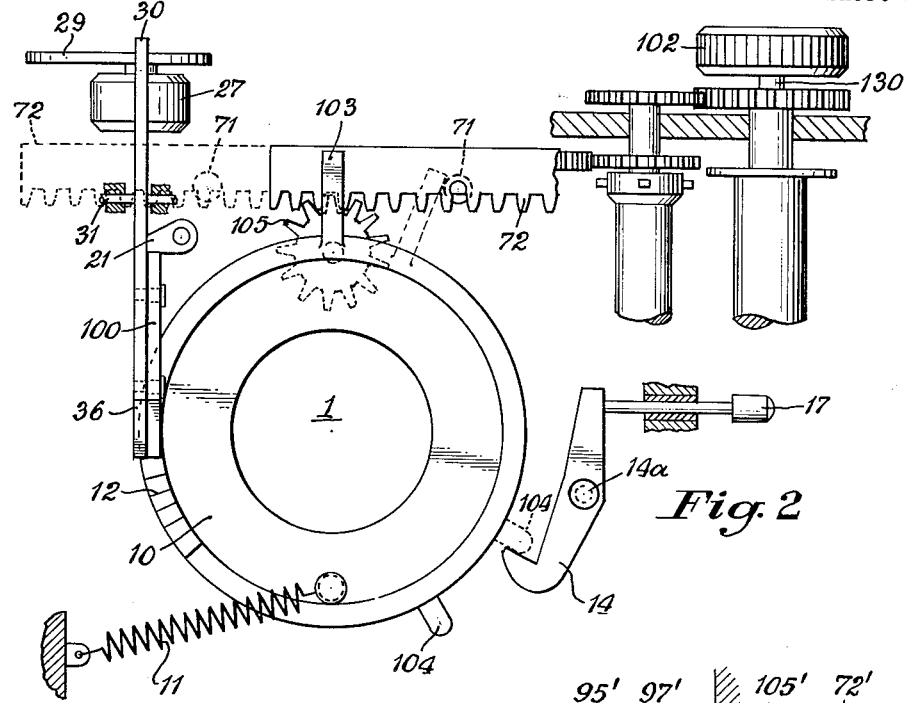

Referring to the FIGS. 1 and 2, a central shutter of conventional construction includes a tensioning shaft 130, a release member 17, a light value adjusting ring 96, and a diaphragm aperture adjusting ring 95, which are arranged concentrically around the objective opening 1 in the objective mount 2. The shutter speed adjusting ring 94 and the diaphragm aperture adjusting ring 95 of the shutter are connected with each other by projections 94a and 95a on the rings 94 and 95 respectively, and extending into a common axial groove 96a provided in the light value adjusting ring 96 so that for long exposures large diaphragm apertures and for short exposures small diaphragm apertures are adjusted. The second diaphragm aperture cage 97 which has mounted therein the diaphragm segments is anchored in the shutter casing. The light value adjusting ring 96 is provided in an axially extending projection with radial recesses 98 for adjustment of the arrangement to the desired film speed. A radial lever 99 connected to a circular disc 10 is adapted to selectively engage one of said radial recesses 98. The disc 10 rotates about the optical axis together with light value adjusting ring 96 and by means of the lever 99 may be coupled with the ring 96 in different rotary positions. The respective adjustment intervals correspond to the speed intervals of the conventional films. The disc 10 is provided with an axial extending sleeve portion 10a provided with steps 12 which are stepped in axial direction. The lower arm 36 of a lever 30, 36 which is swingable between its ends about a horizontal axis 31, extends transversely to the optical axis with its lower end into the range of the steps 12 and functions as a catch member. The upper arm 30 of said lever 30, 36 under the action of a spring 32 engages a cam disc 29 which rotates about a vertical axis and to which cam disc is connected the rotary coil of an electrical measuring instrument 27 forming a part of an exposure meter. The cam disc 29 is rotatably adjusted by the rotary coil 27 according to the value of the light which is measured by said instrument 27. The light value corresponds to the prevailing light conditions of the object to be photographed and which energize the photoelectric cell of the exposure meter. The scanning arm 30 of the lever 30, 36 will be adjusted in accordance with the position of the cam disc 29 and will transfer its deflection to the lower catch arm 36. The catch arm by means of a pin and slot connection carries a slide 100 which is movable tangentially to said sleeve portion 10a with the steps 12 and projects with its lower end in front of the lower end of said catch arm 36. The upper end of the slide 100 has a horizontal projection 101 which is engaged by the release member 21 of the shutter.

The FIGS. 1 and 2 illustrate the camera in a position after the release of the shutter, namely in a run-off condition. The disc 10, however, is still engaged in the catch position which was determined by the previous exposure. For winding the camera the film advance knob 102 on the tensioning shaft 130 is rotated. Hereby the toothed rack 72 is operated and a lateral projection 71 on the latter engages a radial arm 103 on the disc 10 and rotates the latter anti-clockwise (FIG. 2) and against the action of a return spring 11 until a lever 14 rotatable between its ends about an axis 14a engages a projection 104 on the disc 10 and locks the latter against a return movement. In this tensioned position of the disc 10 the lowest one of the steps 12 will be placed opposite the lever arm 36 which position corresponds to the lowest light value to which the shutter may be adjusted. The light value ring 96, the shutter speed adjusting ring 94, and the diaphragm aperture adjusting ring 95, owing to their coupling with the disc 10, will be moved with the ring 10 during this winding of the camera. At the end of this winding operation the diaphragm aperture is completely open and the shutter is adjusted to the longest time. In addition, the shutter tensioning mechanism has been wound by the toothed rack which operates the gear 105.

For making an exposure, the camera release knob 17 is actuated by a pressure of the photographer's finger, hereby releasing the locking lever 14 from its engagement with the projection 104 on the ring 10. This will free the disc 10 which will now move in clockwise direction under the action of the spring 11. This will also cause a rotation of the shutter speed adjusting ring 94 and the diaphragm aperture adjusting ring 95, which will reduce the values of the shutter speed and the diaphragm aperture until one of the steps 12 will engage the catch arm 36 so that the released parts 10, 12, 94, 95, 96 will be arrested in a position which will adjust the diaphragm aperture and the exposure time, taking automatically in consideration the film speed which was previously manually adjusted at 98, 99 to the light value indicated by the measuring instrument 27. At the same time, the slide 100 projecting from the catch arm 36 will be pushed back somewhat (upwardly) by the step 12 which engages the arm 36 and the arm 101 will actuate the shutter release member 21, but due to the delay in the run-off of the shutter tensioning mechanism the exposure will be made only then after the shutter speed and the diaphragm aperture have been adjusted according to the light value indicated by the exposure meter.

In the embodiment of the present invention shown in the FIGS. 3 to 6 the automatic exposure control device is disconnectable. This automatic exposure control device may cooperate with the electrical exposure meter, namely with the cam disc 29 and the lever 30 shown in the FIGS. 1 and 2, or also with an electrical exposure meter such as is shown in FIG. 7. The FIGS. 1 and 2 illustrate the basic construction of an electrical exposure meter cooperating with a scanning member, such as the lever 30, while FIG. 7 shows the detailed construction of a scanning mechanism cooperating with an exposure meter. These figures show the camera in a tensioned condition. At the beginning the toothed rack 72′ was moved in the direction of the arrow in FIG. 4 against the action of a return spring 106′ and adjusted rotatably in clockwise direction by means of the gear 105′ the release ring 6′ which is rotatable about the axis of the objective opening 1′. This adjustment of the ring 6′ took place against the action of the spring 7′. This operation of the release ring 6′ also causes the operation of a ring 107′ by means of a releasable connection. The ring 107′ in turn rotates the shutter speed adjusting ring 94′ and the diaphragm aperture adjusting ring 95′ which are operatively connected with the ring 107′, so that in the same manner as in the previously described embodiment during the mentioned tensioning operation the diaphragm aperture will be completely opened and the shutter will be adjusted for the longest time. Furthermore, a pin 108′ secured at one face of the ring 107′ has moved along the circular disc 10′ which is provided with the arcuate member 10a′ provided with the steps 12′ against the action of the spring 11′. The shutter tensioning device was also wound by the gear 105′. In this tensioned condition the parts are held by a horizontally disposed latch 88′ (FIG. 4) which engages a projection 72a′ on the toothed rack 72′ and thus locks the latter against a return movement by the spring 106′.

The releasable driving connection between the release ring 6′ and the ring 107′ and which is operative during the winding process consists in this that a radial shoulder 109′ (FIG. 6) on the release ring 6′ comes to lie against a nose 110′ of a latch 111′ pivotally mounted between its ends on the ring 107′ and will rotate the ring 107′. A spring 112′ holds the nose 110′ of the latch 111′ in the path of movement of the shoulder 109′. The spring 112′ may be attached with one of its ends to the ring 107′ or may be attached to a stationary part of the lens mount. In the last named case the spring 112′ will act also for the purpose of returning the ring 107′. In the tensioned position of the camera a concentrically arranged rib 113′ which is arranged on an adjusting ring 114′ is rotatable about the optical axis of the camera lens (FIG. 3) and may be used to engage the latch 111′ at its end 115′ as shown in FIG. 6 in such a manner that the nose 110′ at the other ends of the latch 111′ will swing out of the path of the shoulder 109′ of the ring 6′ and will be locked behind a stationary projection 116″ of the lens mount or in a recess in the lens mount. The automatic exposure control may then be disconnected by separating the shutter speed adjusting device and the diaphragm aperture adjusting device, which in this case include the connected parts 94′, 95′, 107′, 108′, 10′, 12′, from the winding gear or tensioning device 72′, 105′, 6′, and by keeping the shutter speed adjusting device and the diaphragm aperture adjusting device locked in their tensioned position. The ring 116′ which is disposed concentrically around the shutter is then used for rotatably adjusting the adjusting ring 114′ whose rib 113′ thereon controls the latch 111′. A locking device 117′ (FIG. 3) consisting of a spring pressed ball or any other suitable locking means retains the ring 116′ in its adjusted position.

The ring arrangement 114′, 116′ is used not only for converting purposes but is used also for considering various exposure factors sometimes employed for special purposes, for instance, when the diaphragm aperture is to be adjusted for flashlight exposures. For this purpose the adjusting ring 114′ is connected with a second diaphragm cage 97′ which in this embodiment is rotatable. When the camera is manually operated, the same arrangement of determining the exposure value is used together with the adjustment of the shutter speed value and of the diaphragm aperture value as in the case of automatic operation of the camera. The operating ring 116′ has an indicating mark 118′ and is adjustable relative to a series of stationary markings (FIG. 5). The markings consist of a mark "A" (Automatic) and a scale 119. This scale as shown may be provided with graduations indicating diaphragm aperture values, or may additionally be provided with guide numbers such as are used for flashlight exposures (a guide number is equal to the product of the distance and the diaphragm value).

An adjustment of the adjusting ring 116′ to the mark "A" takes place when the automatic exposure control is used. In this case the rib 113′ of the adjusting ring 114′ will be in such a position that the nose 110′ of the latch member 111′ will be maintained in its released position from the lens mount lock 116′ and is moved into the path of the movement of the shoulder 109′ on the release ring 6′. The ring 107′ will follow the tensioning movement and also the return movement in opposite direction of the release ring 6' and the circular disc 10' with its steps 12' and the shutter speed adjusting ring 95' will do the same.

For making flashlight exposures when the camera is wound, the adjusting ring 116' with its mark 118' will be adjusted to the respective graduation of the scale 119'. When the adjustment is transferred from the position "A" onto the first graduation of the scale, the rib 113' will move the nose 110' out of the path of the shoulder 109' on the release ring 6' and will switch the latch 111' into locking position at 116" with the lens mount. In this position the ring 107' will not participate in the further return and winding movements of the release ring 6'. Same will remain together with the other parts 10', 12', 94', 95' in the tensioned position. The shutter speed adjusting ring 94' and the diaphragm aperture adjusting ring 95' keep their basic positions which will result in the longest exposure time and the largest diaphragm aperture. The most suitable value of the diaphragm aperture, when making flashlight exposures, is manually adjusted by operating the ring 116' along the scale 119', which will displace the second diaphragm cage 97' relative to the first ring 95' which now constantly remains in the same position. The exposure time remains always the same, for instance 1/30 second. When the camera is released by pressing the left hand end of the pivoted latch member 88' (FIG. 4), the tensioned members 72' and 105' will be operated and return under the action of the spring 106' into their initial position together with the release ring 6'. This ring 6' at the end of this return movement will engage with its projection 18' the release member 21' of the shutter by means of the pair of levers 20' and then the exposure takes place. Upon a renewed tensioning of the camera, which will again tension the shutter actuating mechanism, the release ring 6' will be rotated alone. The necessary free movement relative to the ring 107' results from a one way coupling connection which is operative only in the direction of winding. This is obtained, for instance, in that the coupling pin 108' between the rings 107' and 10' serves as a connecting means with the release ring 6' and moves in a suitably long slot 120' (FIG. 4) provided in the release ring 6'.

The above described disconnection of the automatic exposure means, to which arrangement also belongs a scanning device which will be described in the following, is effective over the entire scale range 119'. When the arrangement shown in FIGS. 3 and 5 is changed from the position "A" onto the scale 119', the largest diaphragm aperture opening which can be used with the shutter when automatically controlled for the flashlight exposures will be lost. This can, however, be avoided, if desired, in that the second diaphragm cage 97' is prevented from following the transfer path but is moved with the ring 116' only in the range of the scale 119'. The described rigid connection (FIG. 3) between the adjusting ring 114' and the diaphragm cage 97' is then omitted. This connection is replaced, for instance, by an elastic clamp 114a on the adjusting ring 114' which is adapted to engage a pin 97a on the diaphragm cage 97'. When the ring 116' is moved from the position "A" into the first graduation line of the scale 119', the clamp 114a will engage the pin 97a on the diaphragm cage 97' which is preferably spring-locked and is in its predetermined end position. The diaphragm cage 97' is locked by a fixed pin 97b and a yieldable locking spring 97c in the position of its greatest aperture, e.g. 2.8. The clamp 114a will then move said ring and said cage together with the rib 113' along the range of the scale 119' in a forward direction and return same until the return of the ring 116' into the "A" position will release the clamp connection by stopping the movement of the diaphragm cage 97' by stepping the same approximately in its previous end position.

The entire shutter speed adjustment and the diaphragm aperture adjustment arrangement 94', 95', 97', 114', 116' for the automatic exposure control of the camera and for manual adjustment of same, including the tensioning and returning means 6', 107', 108' as well as the member 10' with the steps 12', which latter cooperate with the exposure meter, can be employed and installed preferably as a single construction unit into the objective mount with the shutter. Such a unit requires for the connection with the other parts of the camera only one driving member, namely the gear 105', and a member for cooperation with the device controlled by the exposure meter. This second member may consist of the coupling pin 108' for connection with the steps 12' when the latter, as suggested, are arranged in the body of the camera.

A scanning device cooperating with the shutter speed adjusting and diaphragm adjusting means shown in the FIGS. 3 to 6 is shown in detail in FIG. 7. In the perspective view of FIG. 7 some of the details are spread apart in vertical direction for clarity purpose. The figure shows parts of the camera in a tensioned condition.

An indicating device is provided together with the actual scanning device which will indicate the readiness of the camera for exposures at correct light values. This device is disposed below the window 42' in the camera top wall 43' and includes two levers 44' and 45' which are arranged coaxially with respect to the rotary coil 28'. The edge 46' of the lever 44' and the edge 47' of the lever 45' define the indicating field which varies both in longitudinal and lateral directions. Both levers 44' and 45' are controlled individually by a lever 48' which is secured to the shaft 49' of a knob 25'. This knob 25' is rotatably adjustable so that a mark 50' thereon moves relative to a scale 51' which indicates film speeds. Other marks may be provided in addition to said mark 50', as shown, in order to indicate additional features, such as filter factors and others. For controlling the edge of the lever 46' the lever 48' engages with its cam edge 52' the nose 53' of a lever 54' which is pivotally mounted about an axis 55' which by means of a spring 56' is caused to engage the edge 52' with its nose 53'. Gear teeth 57' transmit the movement of the lever 54' to the lever 44'. For controlling the lever edge 47' a nose 58' on the lever 48' engages a cam edge 60' of the lever 45' which is subjected to the tension of the spring 59'.

Below the indicating field, which is defined on its narrow sides by the movable lever edges 46', 47' and on its longitudinal sides by the frame of the window 42', oscillates as a counter mark an indicator hand 40' which is secured to the rotary coil 28' of the exposure meter. The deflection of this indicator hand 40' corresponds to the prevailing light which energizes the photoelectric cell of the exposure meter. The cams 52' and 60' operate according to its predetermined sensitivity range. The cams control, considerable the non-linear characteristics of the measuring instrument, the lever edges 46' and 47' in such a manner that these edges will define between themselves that particular field which corresponds to the adjusted film speed and the intervals of which are representable in the light value range of the shutter. If the indicator hand 40' is visible in the window, it indicates that the camera is ready for an exposure at correct light values. In case the indicator hand disappears under the edges 46' and 47' and is not visible, an incorrect exposure will take place because the light conditions are not correct for an exposure.

In this embodiment of the invention, when using the automatic exposure control, the instrument indicator hand 40' is arrested during the scanning operation. The indicator is stopped in dependence of the movement of the camera release member 17'. When the vertically arranged rod-shaped release member 17' is depressed, it will first tilt by means of the spring 61' and the collar 62' a U-shaped bracket 64' which is pivotally mounted about a horizontal axis 63'. This tilting movement of said bracket is effected against the action of a spring 65' in such a manner that the bracket will press the outer end of the instrument indicator hand 40', which swings in a horizontal plane to both sides of an arc-shaped slot 66' which is provided in a horizontal stationary plate 67', against the lower row of teeth 68' arranged at the slot edges. The instrument indicator hand 40', which is arrested in the above described manner, can now be scanned on its portion which is disposed between the clamping points, without being damaged in any way, or losing any of its sensitivity. The scanning is effected by a further depression of the camera release member 17'. This additional or further depression will result in unlatching an arm 16' of a disc 70' which rotates about an axis 31'. This unlatching is effected by a collar 69' which is fixedly attached to the camera release 17' and which presses against a lever 14' pivotally mounted between its ends about an axis 13'. The disc 70' was moved into the position shown during the winding of the camera by means of a pin 71' on the rack bar 72', which pin 71' engaged a lever 73' so that the gear teeth 74' thereon were rotated counter-clockwise and against the action of a spring 75'. The disc 70' which is unlatched by the release member 17' will run-off in clockwise direction. In its movement the disc 70' will take along by means of a spring 76' the cam member 77' which is coaxially positioned to said disc 70'. The cam member 77' is fixedly connected with the scanning lever 30'. The scanning lever 30' takes over the light value which was determined by the exposure meter by swinging from the shown end position (tensioned position) under the action of the spring 76' in clockwise direction until it reaches the instrument indicator hand 40' which was stopped in a certain deflected position. Therefore, the indicator stops the movement of the scanning lever 30'. A pin 78' on the double arm lever 79' engages the cam member 77' which is firmly connected with the scanning lever 30'. The lever 79' itself is swingable about a pin 80' which is carried by a lever 81'. The latter is itself swingable around a stationary axis 82'. A nose 83' on the lever 81' engages the circumference of a cam 84'. A lever 33' under the action of a spring 85' urges the second arm of the lever 79' in counter-clockwise direction.

In the above described lever mechanism, in which the spring 85' insures a play-free cooperation of the respective parts up to the cam 77', the cam drive 77', 78' transforms the light value which according to the instrument characteristics is non-linear into a linear value in accordance with the graduations of the shutter scale. By means of a cam 84' which is fixedly connected with the adjusting knob 25' the linear film speed value is fed into the adjacent lever differential 79', 80', 81', 82', 83', 84', so that the position of the nose 36' of the lever 33', which is the catch member for the still tensioned steps 12', will represent the sum of the exposure measurement and any adjustment factors which have to be considered.

The yieldable spring connection 76' between the parts 70' and 77' permits the tensioned disc 70' to run-off and to pass through the entire adjustment range of the lever 30' when the disc 70' is released by the release member 17', namely under the action of the spring 76'. This movement of the disc 70' is independent of the intermediate position in which the scanning lever 30' was stopped by the instrument indicator hand 40'. This movement of the disc 70' effects a controlled release of the steps 12' which are still in a tensioned position, i.e. only after the light values and the film speed values are correctly transferred to the catch member 36'. The functions of the scanning members 36 and 36' (FIGS. 1 and 7) cooperating with the steps 12 and 12' respectively, are basically the same. A difference resides in this, however, that in FIG. 1 the lever 36 is arranged directly adjacent the release member 100, 101 which latter, when the lever 36 presses upon one of the steps 12 releases the shutter at 21. In FIG. 7 the catch member 36' solely engages one of the steps 12' and the shutter is released upon actuation of the release lever 88'. It should be noted that the lens shutter according to FIG. 3 is disposed in the rear of the steps 12'. A vertical pin 86' depending from the disc 70' engages laterally with its lower end a horizontal lever 87' which in turn acts upon a release member 88'. The actuated member 88' will release, when the disc 70' reaches its end position, the diaphragm aperture adjusting device and the shutter speed adjusting device of the shutter as shown in the FIGS. 3 to 6 as well as the steps 12' for return movement, which will subsequently effect the exposure. The pin 86' during a relative displacement of the parts 70' and 77' will move in an arc-shaped slot 89' in the cam plate 77'. The size of the slot 89' permits a relative displacement of the parts 70' and 77' over the full deflection range of the scanning lever 30' which in turn slightly exceeds the deflection range of the instrument indicator hand 40'. When the camera is wound, the pin 86' which moves it to its initial position which corresponds to the 77' after reaching the right hand end of the slot 89' and moves counter-clockwise will carry along the cam plate zero position of the instrument indicator hand 40'.

It is advantageous to make the scanning direction of the scanning lever 30' opposite to the deflection direction of the instrument indicator hand 40', namely clockwise when the indicator hand 40' moves in counter-clockwise direction. In such a case the cam plate 77' will engage, when the camera is tensioned, with its longest lever arm the lever system 78', 79', 81', 84', 33' and during scanning the light values the cam plate will rotate in a declining sense and its driving spring 75' will not act against the force of the spring 85'. Therefore, the spring 75' may be made weaker as when the opposite condition would exist, and the force necessary for winding the camera will be smaller.

Because, as shown, the scanning lever 30' scans the instrument indicator hand 40' and always the same portion of same, the visible signal of the indicating device will also indicate the condition of the camera (whether tensioned or released). The visibility of the scanning lever 30' adjacent the instrument indicator hand 40' will indicate the released condition of the camera. This condition can be made even more noticeable by selecting a particular form of color, for instance a red color at the end of the scanning lever 30'. When the camera is tensioned, the scanning lever 30' is moved under the edge 46' of the indicating field 42', 46', 47' and will not be visible.

When the camera release member 17' is vertically depressed, the inclined or conical portion of a collar 90' will push aside a horizontally arranged lever 91' against the action of a spring 92'. The lever 91' will subsequently come to lie above the collar 90' and acts as locking means because it will prevent the return of the release member 17' in its upper normal position, unless the operator depresses the release member to its full extent, but releases the same prior thereto. This could take place after the collar 69' on the release member 17' has released by the action of same the scanning lever 30' by means of the lever 14'. The locking lever 91', therefore, assures that the instrument indicator hand 40' can be engaged by the scanning lever 30' only in its locked condition. The release member 17' will return in its starting position only after a renewed tensioning of the camera by means of the pin 71' on the rack 72', which will also cause a deflection of a lever 93' which will actuate the lever 91' which is fixedly connected with said lever 93' and move it away from the collar 90'. The U-shaped bracket 64' will again release the instrument indicator hand 40' after previously the scanning lever 30' has been returned to its tensioning position away from the indicator hand 40'. Referring to FIG. 4, the radial projection 18' during the counter-clockwise release movement of ring 6', which takes place when the shutter release member 88' has been actuated, causes a release of the shutter, namely when the radial projection 18' engages a pair of levers 20'.

The steps 12' and the catch member nose 36' obviously could be reversely arranged. The steps could be arranged on the catch member 33' and the sleeve portion 10a' on the disc 10' would then have only a single step.

What we claim is:

1. A photographic camera with an automatic exposure control, comprising in combination:
   (a) a shutter provided with a shutter speed adjusting member,
   (b) an adjustable diaphragm provided with two relatively to each other movable diaphragm adjusting members,
   (c) coupling means for connecting one of said two diaphragm adjusting members with said shutter speed adjusting member so that upon movement of said two coupled members in one direction the shutter speed and the diaphragm aperture are reduced and that upon movement of said two coupled members in the opposite direction the shutter speed and the diaphragm aperture are increased.
   (d) a photoelectric exposure meter,
   (e) a device for automatically adjusting the said two coupled members in response to the measureing position of said photoelectric exposure meter,
   (f) means for disconnecting and connecting said last mentioned device, said means including,
   (g) a manually operable member, coupling means for connecting said manually operable member with the other one of said two diaphragm members, and a member operated by said manually operable member and acted upon said device so that in one adjusted position of said manually operable member the said device is operative, while in another adjusted position of said manually operable member, the member actuated by the same effects a disconnection of said device while said coupling means with said other one of said two diaphragm adjusting means becomes effective for a manual introduction of exposure influencing factors into said other one of said two diaphragm adjusting members.

2. A photographic camera as claimed in claim 1, including a catch member adjusted by said exposure meter and moved into the path of movement of said one adjusting member which is coupled with said shutter speed adjusting member, means mounted for relative movement with respect to said catch member and adapted when engaged by said one adjusting member to effect a release of said shutter, said exposure meter being provided with a measuring instrument having a movable indicator hand, means for locking said indicator hand in the adjusted position, a gear, and a scanning device adapted to engage said locked indicator hand and operatively connected with said catch member by said gear.

References Cited in the file of this patent
UNITED STATES PATENTS

| | | |
|---|---|---|
| 2,325,463 | Axler | July 27, 1943 |
| 2,868,095 | Gebele | Jan. 13, 1959 |
| 2,913,969 | Faulhaber | Nov. 24, 1959 |
| 2,969,004 | Gebele | Jan. 24, 1961 |